June 26, 1934.　　　P. M. MILLER　　　1,964,128
MOTOR VEHICLE WHEEL CONSTRUCTION
Filed Jan. 24, 1930
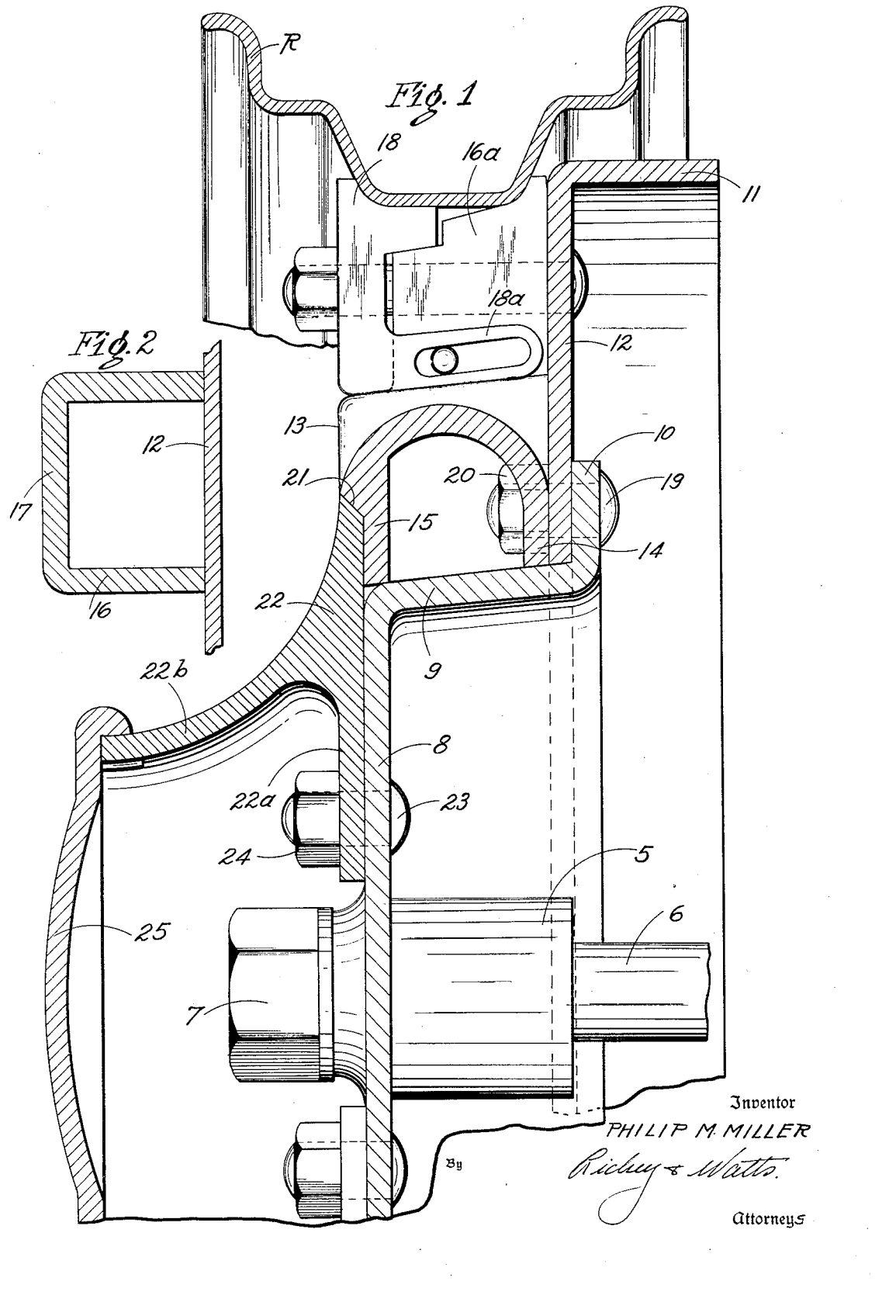
Inventor
PHILIP M. MILLER
By Richey & Watts
Attorneys Patented June 26, 1934

1,964,128

UNITED STATES PATENT OFFICE 1,964,128

MOTOR VEHICLE WHEEL CONSTRUCTION

Philip M. Miller, Youngstown, Ohio, assignor to Miller Devices Inc., New York, N. Y., a corporation of New York Application January 24, 1930, Serial No. 422,991

3 Claims. (Cl. 301—6)

This invention relates to wheels for motor vehicles, and is particularly concerned with wheels of the all metal artillery type.

The principal object of the invention is to provide a metal wheel assembly which is strong and rugged and yet relatively light in weight and embodies beauty of design.

More specifically, the invention is concerned with the construction of a wheel embodying a spider member of material such as cast metal, the interior nave portion of the wheel being so constructed that a spider member having a minimum amount of metal can be used without sacrificing strength. Such type of wheel can be used for both light and heavy duty vehicles.

Due to the particular construction of the nave portion of the wheel, such portion is chambered or of hollow formation for a relatively great area with respect to the over all wheel diameter, thereby forming in effect a heat dissipating and ventilating chamber around the hub of the wheel.

The foregoing and other objects and advantages will become apparent in view of the following description taken in conjunction with the drawing, wherein:

Figure 1 is a substantially central transverse sectional view of a wheel embodying the features of the present invention; and Fig. 2 is a cross section taken through one of the spokes of the spider member of Fig. 1.

Referring to the drawing in detail, 5 designates the hub barrel which houses bearings for the conventional axle shaft 6 and is threaded on its outer extremity to receive a conventional hub cap or nut 7. Preferably formed integral with the hub barrel 5 is a disc-like wall 8 which is radially extended from the outer extremity of the barrel a distance relatively great as compared to the over all wheel diameter, to provide an open nave area which lightens and ventilates the wheel body and permits the use of a spider having relatively short spokes. At its periphery, the wall 8 is extended substantially transversely inwardly for substantially the full width of the wheel to provide a spider mounting member or ledge 9, said ledge being turned radially at its inner extremity to provide an attaching flange 10. This cup-shaped nave member may be formed by a casting or forging operation and is of such wall thickness as to support the outer parts of the wheel.

Mounted on the transversely extending ledge or wall 9 is a brake drum 11 having a web 12 which is formed with an opening of sufficient diameter to relatively snugly engage over said ledge.

A spider member of the artillery type is provided, said spider member being preferably of the cast metal type. The body portion 13 of the spider is formed with a central opening of such diameter as will give it a relatively snug fit on the mounting ledge 9. The sectional view in Fig. 1 is taken between the spokes of the spider member, the spider body being transversely and circumferentially arched between the spokes and formed with inner and outer walls 14 and 15. Between the arched portions of the body wall, the latter is projected radially to define the side and front walls 16 and 17 of the wheel spokes, note Fig. 2. The radially outer extremities of the spokes are given a particular formation to accommodate rim mounting lugs 18. The radially outer extremity of the spokes is indicated at 16a in Fig. 1, the side wall thereof being formed with a transversely inclined recess or slot adapted to receive slotted arms 18a provided on the lugs 18. These arms 18a straddle the spoke ends and slide back and forth on the slotted portion formed in the side walls thereof. A rim R is shown in position on the ends of the spokes. The rim mounting lugs 18 and cooperating free spoke end construction just described is covered by a separate application and has no bearing on the present application.

The spider member together with the brake drum is assembled on the transversely extending ledge or wall 9 and is securely locked in place by means of bolts 19 and nuts 20. To insure against displacement of the parts, the nuts 20 of the bolts 19 may be locked against angular movement by peening over the heads of the bolts or by other suitable means.

The outer face of the spider wall 15 is formed with an annular recess 21 whose circumferential wall is preferably tapered, and fitting into this annular recess and securely clamped against the disc like wall 8 is an outer nave member, generally indicated at 22, which serves to brace the spider member against lateral displacement and at the same time forms a decorative nave covering member for completing the symmetrical contour of the wheel. The nave member 22 is formed with a radially inwardly extending wall 22a which is demountably secured to the wall 7 by means of bolts 23 and nuts 24. This portion 22a of the nave member 22 may be in the form of inwardly extending leg portions instead of a continuous flange formation as shown in the present instance.

The body wall 22b of the nave member 22 is preferably arched and projected transversely outwardly and has detachably secured thereto a cap 25. The nave member 22 may be formed as by casting from suitable material and chrome plated or given any desired decorative embellishment, while the cap 24 may be formed of sheet metal or the like and also suitably embellished to enhance the appearance of the wheel.

From the foregoing, it will be seen that I have provided an all metal artillery type wheel particularly adapted for use with cast metal spider members, which permits the use of a spider member which is relatively light in weight due to the reduction of material in the body portion thereof and the relatively short spokes. The cup shaped nave and hub member is possessed of great strength so that it forms a strong support for the remaining parts of the wheel. Spider members of the free spoke end hollow type may be cast at the foundry with far greater ease than those having relatively long spokes or a heavy body wall. The wheel, when viewed from the exterior simulates in appearance the conventional wooden type artillery wheel and has a pleasing design so that it may be used for both passenger and truck or heavy duty vehicles.

It will be understood that certain modifications and variations in structure may be adopted within the scope of the invention as defined by the appended claims.

Having thus described my invention, what I desire to secure by Letters Patent is:

1. A wheel for motor vehicles comprising in combination with a brake drum having an open central portion, a hub barrel having cast integrally therewith a spider-supporting wall which is extended radially from the outboard extremity of the barrel in the shape of a disk to provide an open nave area around said barrel which lightens and ventilates the wheel body and permits the use of a spider having relatively short spokes, said wall being formed with a substantially transverse offset which extends inwardly for substantially the full width of the wheel and then merges with a radially-extended flange adapted to lie flush against the web wall of the said drum, a cast metal spider member formed with an open annular body and relatively short hollow spokes, the spider body together with said drum being seated directly on said transverse wall, locking bolts passed through the inner wall of the spider member, the web wall of said drum and said radially-extended flange for locking the parts together, a shell-like nave member fitting flush against the outer side wall of the spider member and formed with a radially-inwardly extended portion which is secured to said spider-supporting wall, and a cap on said shell.

2. A metal wheel assembly for motor vehicles comprising in combination with a brake drum having a web wall formed with a large central opening, a hub barrel having formed integrally therewith a cup-shaped spider-supporting member having a wall which is extended radially from the outer extremity of the barrel a distance relatively great as compared to the overall wheel diameter to provide an open nave area which lightens and ventilates the wheel body and permits the use of a spider having relatively short spokes, said wall at its periphery being extended substantially transversely inwardly for substantially the full width of the wheel to provide a spider mounting member and is then turned radially to provide an attaching flange, a cast metal spider member formed with an open body wall and relatively short hollow spokes, the spider body together with said drum being seated directly on said transversely-extended wall and locked to said attaching flange, and an outer nave member secured to the radial wall of the spider-supporting member and having a peripheral flange which fits flush against the outboard side of the spider body and braces the latter against lateral displacement and an outwardly-extending body wall which completes the symmetrical contour of the wheel.

3. A metal wheel assembly for motor vehicles comprising in combination with a brake drum having a web wall formed with a large central opening, a hub barrel having formed integrally therewith a cup-shaped spider-supporting member having a wall which is extended radially from the outer extremity of the barrel a distance relatively great as compared to the overall wheel diameter to provide an open nave area which lightens and ventilates the wheel body and permits the use of a spider having relatively short spokes, said wall at its periphery being extended substantially transversely inwardly for substantially the full width of the wheel to provide a spider mounting member and is then turned radially to provide an attaching flange, a cast metal spider member formed with an open body wall and relatively short hollow spokes, the spider body together with said drum being seated directly on said transversely-extended wall and locked to said attaching flange, and an outer nave member formed with radially-inwardly-extending attaching portions which lie flush against and are secured to the radial wall of the spider-supporting member and a peripheral flange which fits into a recessed portion of the spider body and braces the latter against lateral displacement, the said nave member being provided with a body wall which simulates in appearance a nave-covering shell to complete the symmetrical contour of the wheel.

PHILIP M. MILLER.